United States Patent
Bell et al.

(10) Patent No.: US 7,415,487 B2
(45) Date of Patent: Aug. 19, 2008

(54) APPARATUS AND METHOD FOR DATA WAREHOUSING

(75) Inventors: Christopher R. Bell, Seattle, WA (US); Paul J. Boyd, Seattle, WA (US); Mark E. Dunlap, Sammamish, WA (US)

(73) Assignee: Amazon Technologies, Inc., Reno, NV (US)

(*) Notice: Subject to any disclaimer, the term of this patent is extended or adjusted under 35 U.S.C. 154(b) by 500 days.

(21) Appl. No.: 11/016,563

(22) Filed: Dec. 17, 2004

(65) Prior Publication Data

US 2006/0136354 A1 Jun. 22, 2006

(51) Int. Cl.
*G06F 17/30* (2006.01)

(52) U.S. Cl. .......................... 707/201; 707/3

(58) Field of Classification Search ......... 707/200–206, 707/3–5, 8, 10
See application file for complete search history.

(56) References Cited

U.S. PATENT DOCUMENTS

| | | | |
|---|---|---|---|
| 6,167,405 A * | 12/2000 | Rosensteel et al. | 707/102 |
| 6,178,418 B1 | 1/2001 | Singer | |
| 6,263,337 B1 | 7/2001 | Fayyad et al. | |
| 6,374,251 B1 | 4/2002 | Fayyad et al. | |
| 6,438,538 B1 | 8/2002 | Goldring | |
| 6,550,057 B1 | 4/2003 | Bowman-Amuah | |
| 6,922,685 B2 | 7/2005 | Greene et al. | |
| 2002/0087501 A1 | 7/2002 | Breitbart et al. | |
| 2003/0182312 A1 | 9/2003 | Chen et al. | |
| 2003/0182319 A1 | 9/2003 | Morrison | |
| 2004/0181509 A1 * | 9/2004 | Dettinger et al. | 707/2 |
| 2005/0065944 A1 | 3/2005 | Gunther et al. | |
| 2005/0210082 A1 | 9/2005 | Shutt et al. | |
| 2005/0240354 A1 | 10/2005 | Mamou et al. | |

OTHER PUBLICATIONS

Chaudhuri, et al., "An Overview of Data Warehousing and OLAP Technology," SIGMOD Record, vol. 26, No. 1, Mar. 1997, pp. 65-74.
Plattner, et al. "Ganymed: Scalable Replication for Transactional Web Applications," IFIP International Federation for Information Processing, 2004, vol. 3231, Oct. 18, 2004, pp. 155-174.

(Continued)

*Primary Examiner*—Cheryl Lewis
(74) *Attorney, Agent, or Firm*—Robert C. Kowert; Anthony M. Petro; Meyertons, Hood, Kivlin, Kowert & Goetzel, P.C.

(57) ABSTRACT

An apparatus and method for implementing data warehousing systems. According to a first embodiment, a system may include a plurality of data warehouses, and a data warehouse manager configured to extract data sets from one or more data sources for storage in one or more of the plurality of data warehouses. Each of a first subset including two or more of the plurality of data warehouses may be configured to store a respective replica of a first data set extracted by the data warehouse manager. Further, the data warehouse manager may be further configured to allow a query dependent upon the first data set to be evaluated by one of the first subset of data warehouses before each respective replica of the first data set has been stored to a corresponding data warehouse of the first subset.

69 Claims, 9 Drawing Sheets

OTHER PUBLICATIONS

Delmolino, "Strategies and Techniques for Using Oracle7 Replication," Oracle Coporation, 1995, 14 pages.

Adiba, et al., "Database Snapshots," IBM Research Report, Mar. 7, 1980, pp. 1-16.

Lindsay, et al., "A Snapshot Differential Refresh Algorithm," SIGMOD Record, vol. 15, No. 2, Mar. 28, 1986, pp. 53-60.

Adiba, et al., "Derived Relations: A Unified Mechanism for Views, Snapshots and Distributed Data," Institute of Electrical and Electronics Engineers, IEEE, Sep. 9-11, 1981, pp. 293-305.

Ram, et al., "Extracting Delta for Incremental Data Warehouse Maintenance," IEEE, 2000, pp. 220-229.

Matt Loney, "The Magic that makes Google Tick," http://www.zdnet.com.au/insight/software/0,39023769,39168647,00, Dec. 2, 2004, (5 pages).

Ghemawat et al., "The Google File System," SOSP'03, Oct. 19-22, 2003, (15 pages).

Ghemawat et al., "Google File System," Google Weblog, Google Technical Paper, Sep. 20, 2003, (1 page).

Justin Poetsch et al., "The New Amazon Datacenter Network," Amazon.com, Inc., Jul. 2004, (3 pages).

Demers, et al., "Epidemic Algorithms for Replicated Database Maintenance," ACM 1987, pp. 1-12.

"Epidemic Protocols (or Gossip is Good)", Oct. 7, 1999, found at http://www.cs.cornell.edu/home/rvr/presentations/gossip/ppframe.html, 33 pages (2-sided).

Amazon.com, "Amazon.com Presentation at Oracle World," San Francisco, Nov. 2002, 19 pages (2-sided).

IBM, "Grid File Replication Manager," Aug. 5, 2004, 2 pages.

International Search Report for PCT/US2005/045349, mailed Apr. 19, 2006, 9 pages.

* cited by examiner

APPARATUS AND METHOD FOR DATA WAREHOUSING

BACKGROUND OF THE INVENTION

1. Field of the Invention

This invention relates to computer systems and, more particularly, to implementation of data warehousing systems.

2. Description of the Related Art

As increasing numbers of business functions within an enterprise are automated, the amount of data generated by the enterprise correspondingly increases. Such data may be distributed throughout the enterprise, for example within database systems and other types of systems implemented by different departments or geographical units. In some cases, useful analysis of enterprise data may be made across the natural boundaries between systems or locations that exist. To facilitate such analysis, a data warehousing system may be employed to aggregate data from multiple different systems or locations within a single system, such as a single database. Analysis tools may then target the single, aggregated system rather than various distributed data sources, which may simplify the design of the analysis tools and improve analysis performance.

Often, data warehousing systems support the storage and querying of very large quantities of data using high-end computer systems configured to provide needed analysis performance. However, high-end systems that are highly tuned to a particular data warehousing application can be expensive to procure and maintain, and may not scale well as the data warehousing needs of the enterprise grow. If only a single data warehousing system is provided, for example due to expense, data availability may be compromised if the single warehouse fails. On the other hand, if multiple data warehousing systems are provided, analysis applications may lose the simplicity of assuming a single, aggregated data source. For example, analysis applications may need to be configured to track the location of desired data within the multiple data warehouses.

SUMMARY

Various embodiments of an apparatus and method for implementing data warehousing systems are disclosed. According to one embodiment, a system may include several data warehouses and a data warehouse manager configured to extract data sets from one or more data sources for storage in one or more of the data warehouses. Each of two or more data warehouses may be configured to store a respective replica of a data set extracted by the data warehouse manager. Further, the data warehouse manager may be configured to allow a query dependent upon the data set to be evaluated by one of the data warehouses before each respective replica of the data set has been stored to a corresponding additional one of the data warehouses. Similarly, the data warehouse manager may be further configured to allow a query dependent upon the data set to be evaluated by one of the data warehouses before a modification to the data set has been replicated to a corresponding additional data warehouse.

A method is further contemplated, which according to one embodiment may include extracting data sets from one or more data sources for storage in one or more data warehouses, storing a respective replica of a first data set in each of a first subset including two or more data warehouses, and allowing a query dependent upon the first data set to be evaluated by one of the first subset of data warehouses before each respective replica of the first data set has been stored to a corresponding data warehouse of the first subset.

According to a second embodiment, a system may include data warehouses configured to store data sets extracted from one or more data sources, and a data warehouse manager configured to present the data warehouses to a client as a single data warehouse. Location of the data sets within the data warehouses may be transparent to the client. Also, at a given time, a first data set stored by a first data warehouse and that is available at the given time to the client for querying may be dissimilar to a second data set stored by a second data warehouse and that is also available at the given time to the client for querying. In response to receiving from the client a query directed to a data set stored by one or more of the data warehouses, the data warehouse manager may be further configured to identify a particular one of the data warehouses capable of evaluating the query and to convey the query to the particular data warehouse for evaluation.

A method is further contemplated, which according to an embodiment may include extracting data sets from one or more data sources for storage in one or more data warehouses and presenting the data warehouses to a client as a single data warehouse. Location of the data sets within the data warehouses may be transparent to the client. In response to receiving from the client a query directed to a data set stored by one or more of the data warehouses, the method may further include identifying a particular one of the data warehouses capable of evaluating the query and conveying the query to the particular data warehouse for evaluation. At a given time, a first data set stored by a first data warehouse and that is available at the given time to the client for querying may be dissimilar to a second data set stored by a second data warehouse and that is available at the given time to the client for querying.

Figure 1:
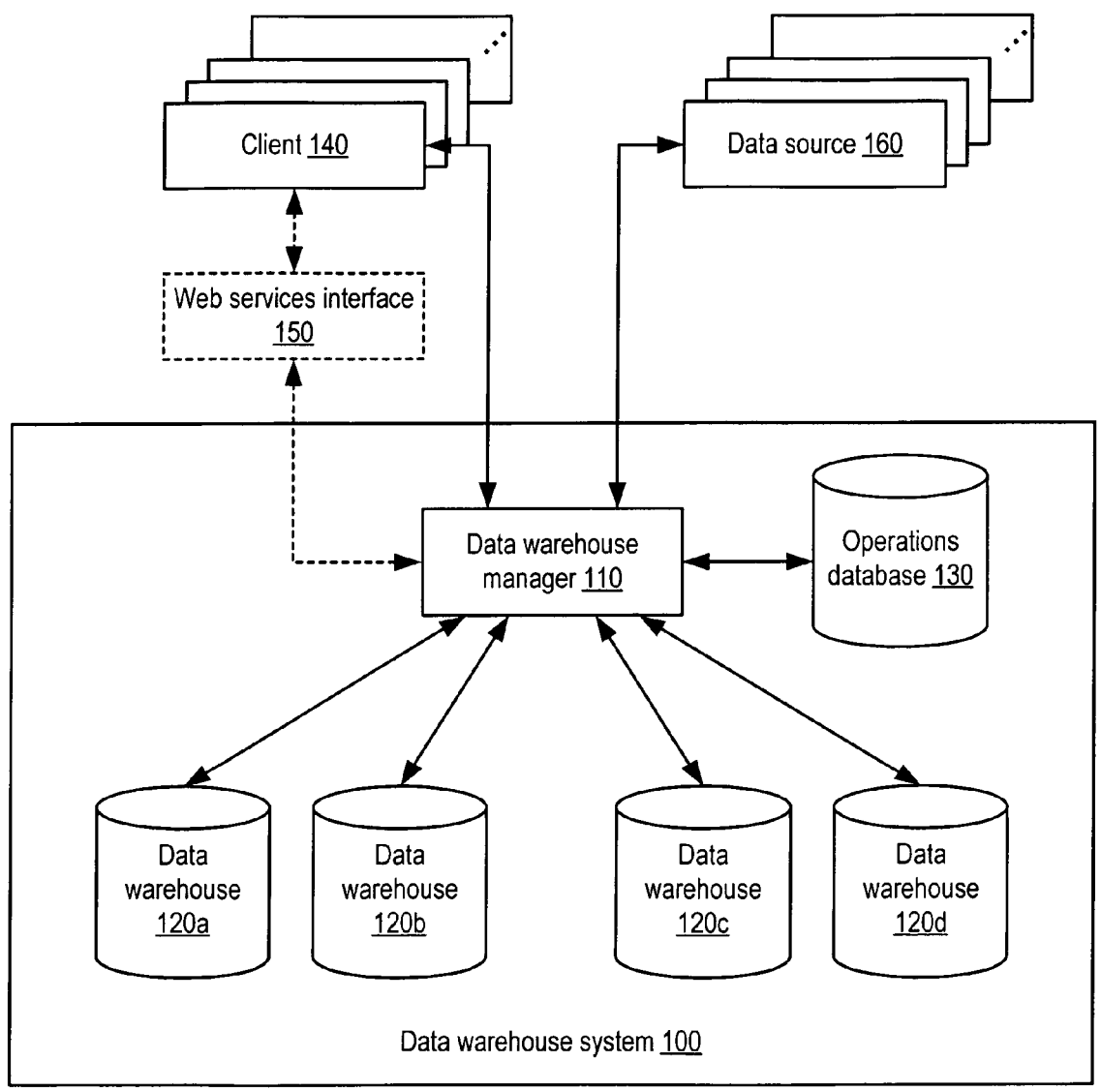
FIG. 1 is a block diagram illustrating one embodiment of a data warehousing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Data Warehousing System

In some complex enterprise computing environments, various sources of data may be distributed throughout the enterprise. For example, an enterprise may implement separate computer systems and/or applications for different business functions, such as accounting, finance, e-commerce, human resources, procurement, manufacturing, distribution, etc. Further, such systems and/or applications may be dispersed and replicated geographically, for example by providing distribution management systems at each distribution site. In some such enterprises, databases or other data stores as well as analysis tools and other applications may be specific to a site or function, and may peripherally interact with systems for other functions or sites.

Providing a specific business function or site with just the data and resources it needs to perform the majority of its tasks may avoid allocation of excess or redundant resources within the enterprise. However, in some instances, data from across the enterprise may need to be analyzed as a whole. For example, analysis of enterprise-wide financial or production trends may depend on the data generated and maintained at multiple different sites or across different departments. In some instances, data analysis tools may be configured to detect complex interrelationships across business functions that are not directly discernible from analysis of a single function in isolation. For example, a relationship may exist between personnel experience and training (tracked by human resources), distribution productivity and financial performance (e.g., reduced number of product returns due to distribution errors). Such a relationship may be identified by examining the data from each of these functions collectively for correlations.

In some embodiments, an enterprise may provide a centralized data warehousing system to facilitate processing and analysis of enterprise-wide data. Generally speaking, a data warehouse may include a database or other data repository that is configured to aggregate data stored in one or more data sources. The data sources may themselves be other databases or other applications within the enterprise that store or produce data. Often, data stored within a data warehouse is derivative of data stored elsewhere within the enterprise. However, in some instances, a data warehouse may also be configured to serve as primary storage for some data, such as enterprise-wide analysis data or even enterprise function or site data.

One embodiment of a data warehouse system is illustrated in FIG. 1. In the illustrated embodiment, data warehouse system 100 includes a data warehouse manager 110, which is configured to interact with a number of data warehouses represented by data warehouses 120a-d in FIG. 1. The number of data warehouses 120a-d illustrated in FIG. 1 is merely illustrative and may differ in other embodiments. Data warehouse manager 110 may also be configured to interact with an operations database 130. Data warehouse manager 110 is also configured to interact with one or more clients 140 and data sources 160, which may be external to data warehouse system 100 (e.g., distributed throughout an enterprise, or across multiple enterprises, at different logical or physical sites). In some embodiments, some clients 140 may be configured to interact with data warehouse manager 110 through a web services interface 150. In some embodiments, data warehouse manager 110 may be configured to interact with some data sources 160 through a web services interface (not illustrated).

In one embodiment, data warehouses 120a-d may include respective relational databases. For example, a given data warehouse 120 may include a database such as Oracle, DB2, Sybase, Informix, Adabas, or any other proprietary or open-source database. In some embodiments, different data warehouses 120 may implement different types of database software from different vendors. Generally speaking, a relational database may organize sets of data items into one or more regular structures, such as tables including rows and columns, although multidimensional relational database structures are also contemplated. Additionally, in many embodiments a relational database may be configured to evaluate queries against the data stored within the database, in order to select a subset of data that satisfies a given query. For example, a database may be configured to store customer order information, which may be organized as one or several tables including data such as a customer identifier, an order identifier, shipping status information, order cost, etc. A user seeking to identify all customers awaiting outstanding shipments may submit a query to the database specifying the selection of all customer identifiers having unshipped orders as of a particular date and/or time. Responsively, the database may examine its contents and return those data records satisfying the constraints of the query. It is noted that in some embodiments, different data warehouses 120 may be located at different physical locations or sites, which, in conjunction with data set replication as discussed below, may enhance the reliability and availability of data sets by decreasing the likelihood that a failure at a single site will compromise all data warehouses 120.

It is noted that although data warehouses 120 may commonly include relational databases, in some embodiments a given data warehouse 120 may include a non-relational database. Typically, in relational databases, the meaning of a particular data item is implicitly described by the location of the data item within the table or other relational data structure. For example, in a particular two-dimensional relational database table, one column may be defined to store a customer identifier, another column may be defined to store shipping status information, and a third column may be defined to store order cost. Individual rows of the table may then correspond to specific order records, and any data item stored in the first column of a row may be interpreted as a customer identifier by virtue of its position. By contrast, in one embodiment a non-relational database may store data items whose interpretation is governed by explicit metadata associated with a given data item, rather than by the position of the data item within a defined data structure. For example, in one embodiment a data warehouse 120 may be configured to store data items as records delimited by a version of the eXtensible Markup Language (XML). In one such embodiment, a given data item such as a customer identifier may be delimited by a metadata field or tag that identifies the type of the data item. For example, the customer identifier "smith" may be stored as "<cust_id>smith</cust_id>", where the metadata tag cust_id denotes that the data delimited by the tag may be interpreted as a customer identifier. In general, data items of records within non-relational databases may be stored in any order within the record, as the meaning of a given data item is stored explicitly along with the data item, rather than implicitly via the position of the data item.

As mentioned previously, in some embodiments data warehouses 120 may be configured to aggregate data stored elsewhere within an enterprise, such as by data sources 160. In some embodiments, as described in greater detail below, the quantity of data stored by data warehouses 120 may be quite large, for example on the order of multiple terabytes (TB). In the illustrated embodiment, data warehouse manager 110 may be configured to coordinate how data is retrieved and stored among data warehouses 120, as well as to coordinate access to data warehouses 120 by clients such as clients 140. Specifically, in one embodiment data warehouse manager 110 (or simply manager 110) may be configured to extract data from one or more data sources 160, and to coordinate storage of the extracted data in one or more of data warehouses 120.

In some instances, manager 110 may additionally transform the extracted data before it is stored. For example, in one embodiment a given data warehouse 120 may store a table including data derived from several different data sources 160. In such an embodiment, manager 110 may be configured to transform the individual data items drawn from the different data sources 160 into the format required by given data warehouse 120. In some embodiments, transformation of data may include modification of the data itself, as opposed to rearranging or reformatting data. For example, in some embodiments manager 110 may be configured to scale or round particular data items before storing them in data warehouses 120, or may apply any other suitable transformation. In some embodiments, manager 110 may also be referred to as an extraction, transformation and load (ETL) manager.

In the illustrated embodiment, operations database 130 may be configured to store and track information pertaining to the operational state of data warehouse system 100, which may include information pertaining to the location of data items or sets of data (such as tables or individual records, for example) within data warehouses 120 as well as the state of data items or data sets with respect to outstanding operations to modify data within data warehouses 120. In some embodiments, operations database 130 may include a relational or non-relational database similar to those described above, including a query interface for accessing and modifying its contents, while in other embodiments operations database 130 may include a custom software application configured to interact with manager 110 through, for example, procedure calls defined in a custom application programming interface (API). The operation of manager 110 in conjunction with operations database 130, in various embodiments, to load data warehouses 120 and to virtualize the presentation of data warehouses 120 to clients 140 is described in greater detail below in conjunction with the descriptions of FIGS. 3-6.

It is contemplated that in some embodiments, manager 110 and/or operations database 130 may be implemented via robust, fault-tolerant systems. For example, overall reliability and availability of manager 110 and/or operations database 130 may be increased through the use of redundant (e.g., hot standby) or clustered computer systems, such that manager or database operation may continue in the event of a failure of one or more systems. Any suitable type of failover mechanism may be employed to decrease the sensitivity of data warehouse system 100 to a failure of manager 110 or operations database 130.

Also, it is contemplated that in some embodiments, separating the implementation of manager 110 and/or operations database 130 from that of data warehouses 120 may reduce the cost or complexity associated with data warehouse system 100. For example, such separation may facilitate the use of commodity computer systems and/or database software to implement the control functions of manager 110 and operations database 130. Such separation may also facilitate scaling of data warehouse system 100 by enabling control hardware to be upgraded separately from data warehouse hardware. In some embodiments, such separation may also increase the overall availability of data warehouse system 100 and reduce failure recovery time. For example, if one data warehouse 120 should fail, operations database 130 and manager 110 may continue to load other data warehouses 120 while the failed warehouse is recovered. Similarly, if operations database 130 should fail, it may not be necessary to recover any of data warehouses 120, thus reducing overall failure recovery time.

Clients 140 may generally include any software application or other entity configured to access data warehouse system 100. For example, in one embodiment a client 140 may include an application configured to retrieve data (e.g., via a query). Such an application might include a data analysis application, a decision support system, a data viewing application, or any other suitable application. A client 140 may also include an administrative application or utility that may configure the operation of data warehouse system 100. For example, a data analyst or administrator may determine that a combination of data items from a particular set of data sources 160 should be aggregated by data warehouse system 100 for future analysis. The analyst or administrator may use a client 140 to instruct manager 110 to extract the relevant data set from data sources 160, for example on a one-time or recurring basis. In various embodiments, clients 140 may be configured to operate on any suitable type of system, such as general-purpose computer systems, handheld systems or embedded systems, for example. In some embodiments, a client 140 may be configured to interact with data warehouse system 100 via an intervening system. For example, a client 140 may be implemented via a client-server system (not shown) where the server system is configured to mediate communications between the client 140 and data warehouse system 100.

Instead of communicating directly with an API provided by manager 110, in some embodiments some or all of clients 140 may be configured to communicate with manager 110 via web services interface 150. Generally speaking, a web services interface may be configured to provide a standard, cross-platform API for communication between a client requesting some service to be performed and the service provider. In some embodiments, web services interface 150 may be configured to support the exchange of documents including information describing the service request and response to that request. Such documents may be exchanged using standardized web protocols, such as the Hypertext Transfer Protocol (HTTP), for example, and may be formatted in a platform-independent data format, such as XML, for example. By employing the web services model, including the use of standard web protocols and platform-independent document formatting, the number of types of interfaces manager 110 needs to support may be reduced, and cross-platform interoperability of clients 140 and manager 110 may be improved.

In some embodiments, data sources 160 may themselves include relational or non-relational databases, and may be distributed throughout the enterprise. Such databases may or may not be of the same type (e.g., vendor or format) as those of data warehouses 120. In other embodiments, data sources 160 may be applications other than databases, such as custom or proprietary applications configured to store data in document form or in another form. In such embodiments, manager 110 may be configured to communicate with the data source 160 using the necessary protocol for obtaining data (e.g., a particular format of procedure call defined by the data source's API). Data sources 160 may also include repositories of documents, such as collections or archives of transaction logs, email communications, word processor/office application documents, images or multimedia files, web page documents, XML documents, metrics on the operation of an e-commerce site, or any other suitable type of document or data. For example, in one embodiment a data source 160 may include a network-attached mass media storage device, such as a standalone disk array or a storage device coupled through a Storage Area Network (SAN).

Regardless of the specific type(s) of data source 160, manager 110 may be configured to perform the appropriate operations to extract therefrom the desired data set(s), apply any necessary transformations to convert the data into a format suitable for storage in data warehouses 120, and to load the extracted data to one or more of data warehouses 120. Where the data content of a particular data source 160 is highly dissimilar in format to the data stored by data warehouses 120, manager 110 may be configured to analyze the data source 160 to derive a relevant metric or indication of the data content, or to invoke another application to perform such analysis.

Data Warehouse Replication, Rough Synchronization and Virtualization

Data stored by data warehouses 120 may be critical to the operation of the enterprise, in some instances. For example, in some embodiments analysis software may be configured to operate on warehoused data to generate reports and/or identify trends, which may in turn influence operational decisions such as ordering/procurement decisions, staffing decisions, etc. For example, enterprise-wide analysis of one day's production metrics may influence a decision to shift resources within the enterprise, reschedule the next day's production, expedite feedstock or inventory procurement, etc. Should data on which to perform relevant analysis be lost or corrupted within data warehouses 120, operational or strategic decision-making processes may be significantly impaired, or in some cases completely disabled.

Some warehoused data may be derivative of data stored by data sources 160, as described above, and in principle may be restored by reloading the relevant data to data warehouses 120 from those data sources 160. However, such reloading may take a significant amount of time to complete, for example if the quantity of data lost or corrupted is large, or if data sources 160 must access slower archival media (such as tapes or offline media) to retrieve the requested data. It may not be possible to reload the needed data in a timeframe that creates minimal disruption to processes that depend on warehoused data. Further, in some instances, data stored on data warehouses 120 may be the primary output of an application utilizing data warehouse system 100 (e.g., an analysis application) and so may not be restored simply by reloading it from data sources 160.

Figure 2:
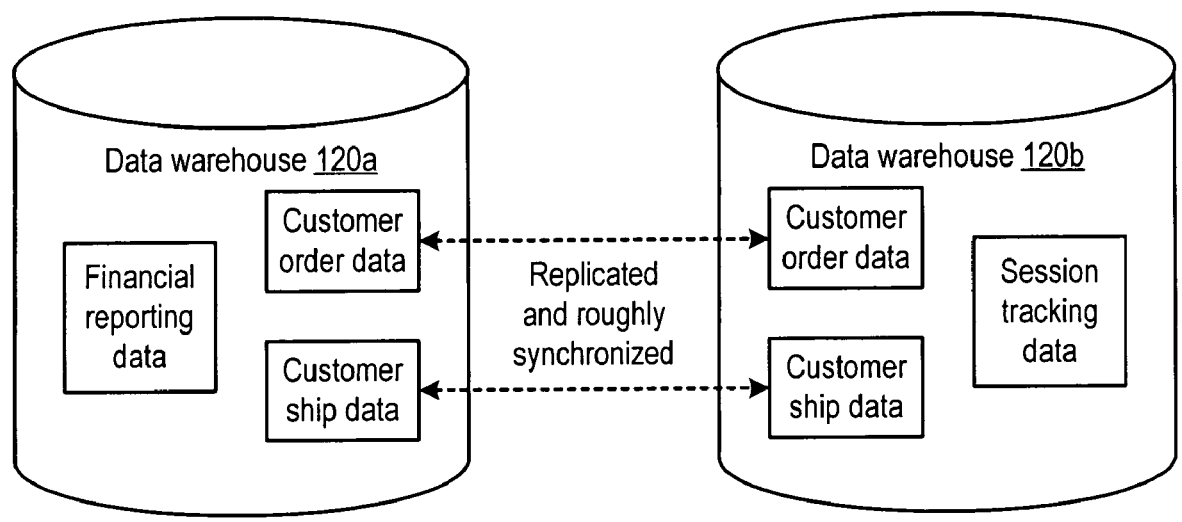
FIG. 2 is a block diagram illustrating one embodiment of data set replication across data warehouses.

To decrease the likelihood of data loss and consequent disruption, in one embodiment a subset of data warehouses 120 may be configured to replicate a particular data set. That is, two or more of data warehouses 120 may be configured to store a respective replica of a data set, such as a table or set of records. One embodiment illustrating such replication is illustrated in FIG. 2. In the illustrated embodiment, data warehouses 120*a-b* are each configured to store replicas of tables containing customer order data and customer ship data. It is noted that in some embodiments, a particular data set may be replicated by an arbitrary number of data warehouses 120, from two up to the number of data warehouses 120 within data warehouse system 100. On the other hand, in some embodiments, certain data sets may not be replicated at all, or may be replicated on other data warehouses. In the illustrated embodiment, data warehouses 120*a-b* each include tables not replicated by the other (financial reporting data and session tracking data, respectively). It is noted that in some embodiments, different data sets may be stored by data warehouses 120 using different database schemas (e.g., using different data field definitions and/or structure).

In some embodiments, the data sets stored by data warehouses 120 may be common to many different types of enterprises. For example, customer order and shipping data may be commonly available data sets within both brick-and-mortar enterprises and enterprises that provide virtual customer interfaces (e.g., web-based electronic commerce interfaces or e-commerce interfaces). However, in some embodiments, enterprises supporting e-commerce interfaces may be configured to collect and store substantial amounts of information regarding customer interaction with the enterprise, even before a sale occurs. In one embodiment, the session tracking data set illustrated in FIG. 2. may be configured to store data regarding any aspect of a customer's interaction with an e-commerce interface. For example, the session tracking data set may be configured to store data indicating the specific items a customer viewed during a visit to the enterprise's web site (e.g., a session), as well as the duration of the view, the links the customer navigated during the session, any searches performed by the customer, etc. Analysis applications may be configured to analyze these and other types of tracking data to discern customer preferences, predict likelihood of a customer's ordering various items, customize the e-commerce interface presented to the customer, etc.

However, it is noted that data warehousing and the various techniques described below may be equally applicable in enterprises without substantial e-commerce components. For example, some enterprises may have highly complex internal processes spanning numerous functional and geographical divisions, and may internally generate prodigious amounts of data available for warehousing even apart from the activity of external customers. Further, in some embodiments an enterprise may be sufficiently complex that it may employ information gathering strategies similar to the e-commerce oriented activities described above for activities and transactions internal to the enterprise. For example, different business units within an enterprise may interact with other business units as customers similar to external customers, and may generate customer data in a similar fashion.

In some embodiments, subsets of data warehouses 120 may be configured to store different types of data with varying degrees of replication. For example, in the embodiment of FIG. 2, data warehouses 120*a-b* may be configured to store customer order and ship data in a replicated fashion, as shown. In a similar embodiment, data warehouses 120*c-d* may be configured to store historical session tracking data (e.g., the previous fifteen months' worth of tracking data) in a replicated fashion (not shown). In such a configuration of data warehouses 120, warehouses 120*a-b* may form a functionally clustered or grouped set of warehouses particularly suitable for analyses involving customer order and ship data, while warehouses 120*c-d* may form a similarly functionally clustered set of warehouses particularly suitable for analyses involving session tracking data. In each case, relatively critical data may be replicated to help protect against data loss. In such a configuration of warehouses 120*a-d*, analysis-driven queries to customer data may also frequently target recent session tracking data. For example, analysis of customer ordering and shipping patterns may attempt to correlate such patterns to recent session tracking data (e.g., the previous 90 days' worth of tracking data). Thus, in the embodiment of FIG. 2, data warehouse 120*b* is configured to store a set of session tracking data. However, in view of data warehouses 120*c-d* being configured to redundantly store a larger set of session tracking data (from which the set stored by data warehouse 120*b* may be reconstructed if necessary), the session tracking data stored by data warehouse 120*b* may not be replicated.

Clustering or grouping of data warehouses 120 with respect to certain data sets, such that different groups of data warehouses 120 may be optimized for different types of queries, may enable data warehouse system 100 to be more optimally tuned for an anticipated pattern of usage. For example, hardware systems underlying data warehouses 120 may be provisioned with more or fewer computing resources depending on the degree of activity a given clustering of data warehouses 120 is expected to handle, as described in greater detail below in conjunction with the description of FIG. 7. However, in other embodiments, data sets may be distributed across data warehouses 120 in a more homogeneous fashion. For example, in one embodiment each data warehouse 120 may include roughly the same set of computational resources, and data sets may be distributed in various degrees of replication across the roughly equivalent data warehouses 120. While hardware resources may be less optimally tuned with respect to data storage and retrieval activity in such an embodiment, a relatively homogenous implementation of data warehouses 120 may be more easily scaled, for example by adding additional, similarly configured data warehouses 120 as needed to process growing data analysis requirements.

As mentioned above, replication of data sets across data warehouses 120 may increase overall reliability of data by decreasing the likelihood that failure of a given data warehouse 120 will result in data loss. Such replication may also increase the availability of data sets by increasing the number of data warehouses 120 that can provide replicated data sets to clients, for example in response to queries. In the embodiment of data warehouse system 100 illustrated in FIG. 1, manager 110 may be configured to coordinate the storage of data to data warehouses 120, including any replication of data sets among multiple warehouses 120. Thus, in the illustrated embodiment, whether a given data set is replicated or not may be transparent to a particular data warehouse 120. However, it is contemplated that in some embodiments, the management and replication of data sets across data warehouses 120 described herein as a function of manager 110 may instead be distributed cooperatively among data warehouses 120, or implemented by a particular data warehouse 120 configured to function as both data warehouse and manager.

Individual data sets stored by data warehouses 120 may in some instances be quite large, for example on the order of hundreds of megabytes (MB) or gigabytes (GB). Further, even partial updates to a given data set by manager 110, for example in response to a periodic extraction of new operational data from data sources 160, may include substantial quantities of data to be conveyed to a given data warehouse 120. If a data set is replicated across several data warehouses 120, ultimately the data including the data set as well as ongoing updates to that data will be stored among those several data warehouses 120. However, such storage may not occur instantaneously. For example, even if manager 110 simultaneously commenced storing identical data to data warehouses 120*a-b*, the data storage may not complete at the same time in both data warehouses 120*a-b*. Factors such as differing computational load (e.g., servicing of queries) as well as underlying resource configurations may cause one data warehouse 120 to finish the storage operation more quickly than another. Consequently, at any given time before the storage operation completes on both data warehouses 120*a-b*, the state of the data set being stored may differ on data warehouses 120*a-b*. The data set may also be referred to as being out of synchronization or unsynchronized while in this state.

Unsynchronized data could present problems for clients 140 attempting to retrieve the data. For example, if a given replicated data set were in two different states on data warehouses 120*a-b* when a query targeting the given data set was received by manager 110, the query could return two different results depending on the state of the given data set in the particular data warehouse 120 to which the query was directed for evaluation. Such inconsistency could result in inconsistent client operation, particularly if the replication of data sets among data warehouses 120 (or more broadly, the general configuration of data warehouse system 100) is transparent to clients 140.

One approach to preventing inconsistent client behavior due to uncontrolled access to unsynchronized data may include manager 110 preventing any access to a replicated data set while that data set is unsynchronized across multiple data warehouses 120. For example, in one embodiment manager 110 may be configured to implement updates to replicated data sets as atomic or transactional operations. Generally speaking, an atomic or transactional operation involving synchronization across multiple entities is treated as indivisible with respect to other operations; that is, such an operation completes to either all or none of the entities involved before another operation targeting those entities is allowed to proceed. Thus, in one embodiment manager 110 may disallow attempts to access a replicated data set being stored or modified until all replicas of the data set stored on all relevant data warehouses 120 have completed, thereby ensuring that a client does not receive inconsistent results when attempting to access the replicated data set.

However, implementing atomic or transactional synchronization across all data set replicas may significantly decrease performance of data warehouse system 100. For example, where a given replicated data set is large, significant latency may be incurred in waiting for updates to all data set replicas to complete before the data set can be accessed. Consequently, in one embodiment manager 110 may be configured to roughly synchronize data sets replicated across data warehouses 120. In one embodiment, rough synchronization of a data set may include atomically synchronizing updates to a replicated data set within a particular data warehouse 120 while allowing accesses to other replicas of that data set stored by other data warehouses 120. That is, in one embodiment manager 110 may atomically lock a particular table of a particular data warehouse 120 (such as the customer order data table of data warehouse 120*a* shown in FIG. 2) against other read or write accesses while updating that particular table. Meanwhile, manager 110 may conditionally allow a replica of the particular locked table to be accessed on another data warehouse 120 (e.g., the replicated customer order data table of data warehouse 120*b*). In an alternative embodiment, manager 110 may atomically lock an entire data warehouse 120 while updating a data set stored therein, or may lock only a portion of a data set being updated, such as a row within a table; it is contemplated that any suitable locking granularity may be employed by manager 110. It is additionally contemplated that in some embodiments, manager 110 may be configured to lock a portion of a data set being updated on a given data warehouse 120 while allowing an unlocked portion of the same data set on the given data warehouse 120 to be separately accessed for reading or updating.

In one embodiment, manager 110 may conditionally allow access to one data set replica while another data set replica is being updated if the access does not depend on the data update. For example, a client 140 may submit a query requesting all customer ship data for the previous complete calendar quarter (e.g., excluding the current calendar quarter). Meanwhile, manager 110 may be in the process of extracting customer ship data for the previous day from numerous customer fulfillment sites, each of which may include a data source 160. Manager 110 may be configured to update the customer ship data table stored by data warehouse 120a, using any appropriate locking scheme to ensure synchronization within data warehouse 120a. While the update to warehouse 120a is ongoing, queries against its replica of customer ship data (or, in some embodiments, queries against any data within warehouse 120a) may be disallowed. However, manager 110 may be configured to detect that the submitted query for customer ship data for the previous calendar quarter does not depend on the update currently ongoing to data warehouse 120a. That is, all the data necessary to satisfy the query may be present within data warehouse 120b, even though the customer ship data within data warehouse 120b is not completely synchronized with the replica within data warehouse 120a. Consequently, manager 110 may allow the query to be evaluated by data warehouse 120b before the customer ship data updates have been stored to data warehouse 120b. In this example, the data set in question is not perfectly synchronized across data warehouses 120a-b, but rather roughly synchronized, where data warehouses 120 having sufficient data to evaluate a query are allowed to do so even if they do not possess the most current version of the data set in question.

In the embodiment of data warehouse system 100 shown in FIG. 1, manager 110 may be configured to utilize operations database 130 to maintain information about data sets stored by data warehouses 120, such as information identifying the location(s) where a given data set is stored (e.g., the specific data warehouses 120 having the sole copy or a replica of the given data set) as well as information identifying the state of each copy of a data set with respect to any ongoing update activity. For example, in one embodiment operations database 130 may include a respective record corresponding to each copy of the customer ship data table stored by data warehouses 120. For the embodiment shown in FIG. 2, operations database 130 may store two such records, each of which identifies respective data warehouses 120a-b as storing respective replicas of the customer ship data table. Further, each record may include a field indicating the status of the table within the corresponding data warehouse 120a-b. Referring to the example given in the previous paragraph, while manager 110 is coordinating the update of the customer ship data table within data warehouse 120a, the corresponding record within operations database 130 may indicate that that replica is being updated, is unavailable, or other suitable status. In contrast, the record for the customer ship data replica stored by data warehouse 120b may indicate that the replica is not being updated, or that its update has already completed.

In various embodiments, operations database 130 may be configured to store different types of data identifying the location and state of data sets. For example, location identifying data may include unique identifiers for data warehouses 120, such as system names, internet protocol (IP) addresses, or other suitable identifiers. State information may range from simple semaphores indicating whether a given data set is being updated or not to more complex fields characterizing the state of a given data set. For example, in some embodiments, state information corresponding to a data set may indicate the last time it was updated, the data sources 160 used to perform the update, the cause of the update (e.g., due to a scheduled operation or a manual operation), or any other suitable state information. In some embodiments, manager 110 may be configured to use transactional operations to read and/or modify operations database 130 in order to ensure synchronization of operational state (for example, in embodiments where manager 110 is configured to support multiple concurrent read or write operations to data warehouses 120).

Figure 3:
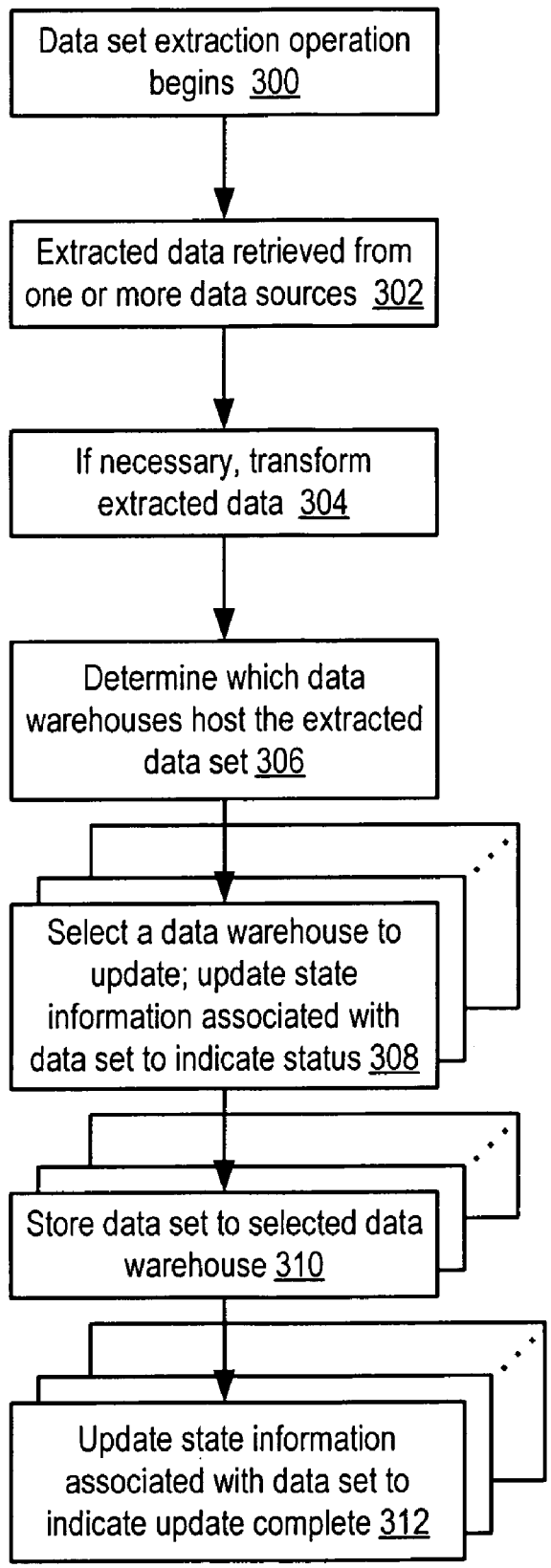
FIG. 3 is a flow diagram illustrating one embodiment of a method of storing extracted data into data warehouses using rough synchronization.

The location and state information stored by operations database 130 may be used by manager 110, in one embodiment, to implement rough synchronization of data stored by data warehouses 120. That is, manager 110 may be configured to consult operations database 130 when extracting and storing data into data warehouses 120, as well as when receiving operations to retrieve stored data (e.g., queries). One embodiment of a method of storing extracted data into data warehouses 120 using rough synchronization is illustrated in FIG. 3. Referring collectively to FIG. 1 through FIG. 3, operation begins in block 300 where an operation to extract a data set from one or more data sources begins. For example, in one embodiment manager 110 may be configured to extract a data set such as customer ship data from one or more data sources 160, such as customer fulfillment sites distributed throughout an enterprise, on a recurring basis (e.g., hourly, nightly, weekly). Alternatively, a user or application may request via a client 140 that a data set be extracted and stored. In some embodiments, it is contemplated that multiple data sets may be concurrently extracted from data sources 160 and updated within one or more data warehouses 120. For example, multiple data sets may be concurrently extracted and stored as a batch job or process, such as a scheduled batch job, or data sets may be dynamically streamed from data sources 160 and updated within data warehouses 120.

Subsequently, manager 110 retrieves the extracted data, for example by issuing queries or other commands to data sources 160 to elicit data (block 302). Extracted data may be transformed if necessary (block 304). For example, extracted data may need to be reformatted, or the data itself modified according to the data storage requirements of data warehouses 120 as described above.

Manager 110 then determines which data warehouses 120 host the extracted data set (block 306). For example, in one embodiment manager 110 may consult operations database 130 to determine the locations where the extracted data set resides, according to records stored therein. Manager 110 then selects a particular data warehouse 120 to update with the extracted data set, and updates state information associated with the data set to indicate that the update is occurring (block 308). In some embodiments, manager 110 may be configured to update each data warehouse 120 that hosts the extracted data set in a parallel or overlapping fashion, although these updates may begin or end at different times. Such parallelism is illustrated in FIG. 3 with respect to the repeated ones of blocks 308-312, which may be performed in parallel for each of several different data sets or data set replicas. For example, manager 110 may be configured to begin updating the extracted data set on several different data warehouses 120 at the same time, or may stagger the updates such that they partially overlap in time. Also, it is noted that in some embodiments, multiple different data sets may be concurrently updated within multiple different data warehouses 120.

In other embodiments, manager 110 may be configured to update data warehouses 120 in a serial or conditional fashion. For example, if the extracted data set is replicated by a subset of data warehouses 120, manager 110 may randomly select a particular data warehouse 120 to begin updating. Alternatively, manager 110 may select the least busy data warehouse 120 of the subset, or may use some other selection criterion. In some embodiments where operations database 130 tracks outstanding data set read operations, a data warehouse 120 may not be selected for a data set update if the data set is currently being read (e.g., by a query). Once a data warehouse 120 is selected, in one embodiment manager 110 may update state information in the record stored in operations database 130 associated with the data set and selected data warehouse 120 to indicate that the data set is being modified on the selected data warehouse. As noted above, in some embodiments manager 110 may use transactional operations to interact with operations database 130, for example to ensure proper ordering of multiple concurrent operations.

The extracted data set is then stored to the selected data warehouse 120 (block 310). It is noted that other replicas of the data set may be accessed and/or updated via other data warehouses 120 while the update to the selected data warehouse 120 proceeds. Once the update is complete, manager 110 updates the state information associated with the data set to indicate the completion of the update (block 312).

It is contemplated that in some embodiments, manager 110 need not buffer the extracted data set while it is stored in turn to its corresponding data warehouses 120. In one alternative embodiment, manager 110 may select a data warehouse 120 to update before beginning data extraction from data sources 160. Manager 110 may then stream or cause to be streamed the extracted data (applying appropriate transformations) to the selected data warehouse 120, and may subsequently use the updated data warehouse 120 as the data source for updating other data warehouse 120. It is further contemplated that in some embodiments, multiple data warehouses 120 may be updated concurrently, rather than in sequence. For example, if a given data set is replicated in three data warehouses 120, two of them could be concurrently updated while leaving the third available for queries to the given data set. Finally, in some embodiments total synchronization (as opposed to rough synchronization) may be achieved by updating all (or a selected subset of) data warehouses 120 concurrently, indicating state appropriately in operations database 130.

Figure 4:
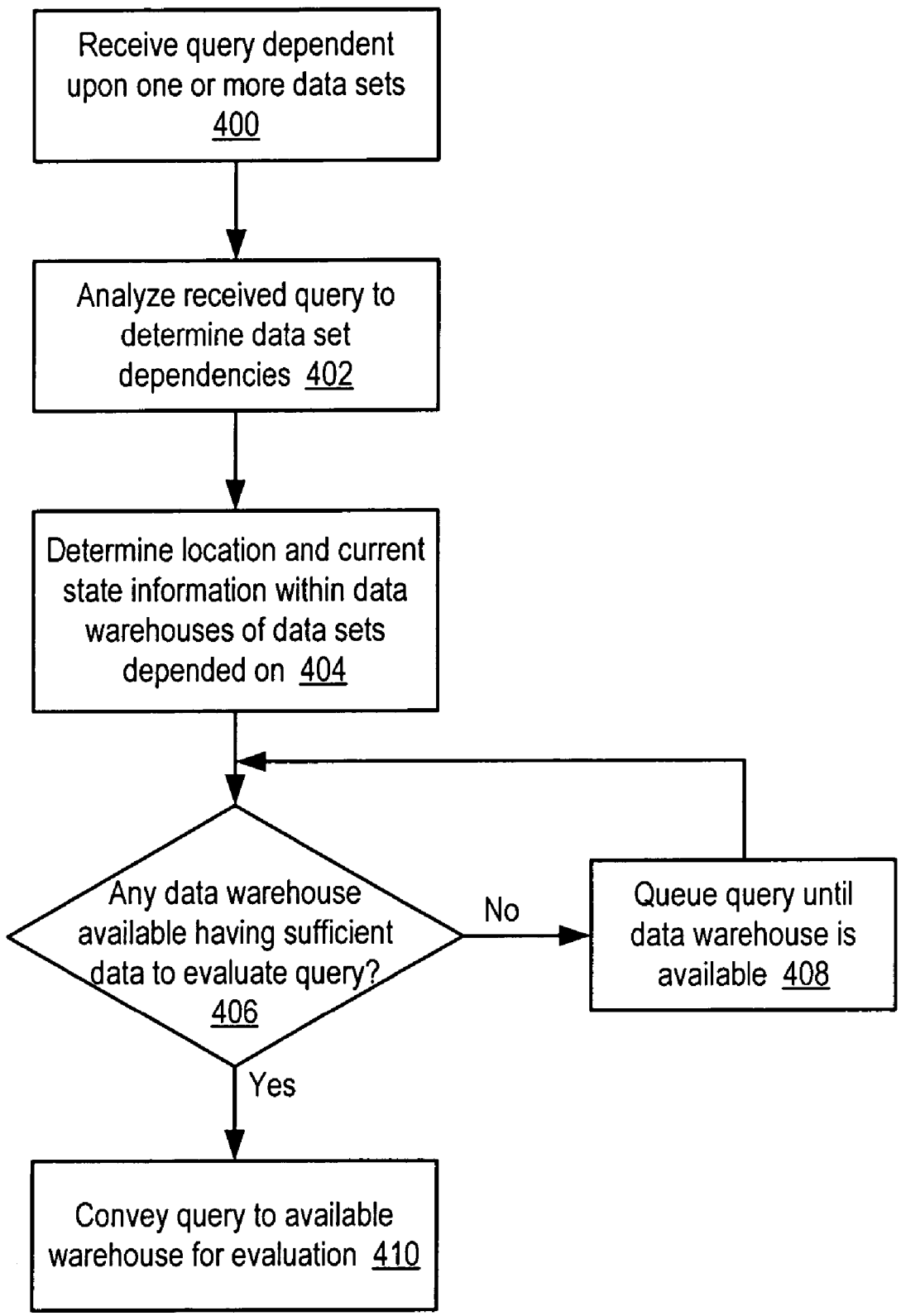
FIG. 4 is a flow diagram illustrating one embodiment of a method of querying data stored by data warehouses using rough synchronization.

One embodiment of a method of querying data stored by data warehouses 120 using rough synchronization is illustrated in FIG. 4. Referring collectively to FIG. 1 through FIG. 4, operation begins in block 400 where query operation dependent upon one or more data sets stored by data warehouses 120 is received. For example, in one embodiment manager 110 may be configured to receive such queries from clients 140, either directly or via web services interface 150.

Subsequently, manager 110 analyzes the received query to determine the data set dependencies of the query (block 402). In some embodiments, determining data set dependencies may include determining the specific data sets referenced by the query, as well as any additional state information pertinent to the data sets depended on. For example, in one embodiment manager 110 may determine that a particular query depends on the customer ship data table illustrated in FIG. 2, and further that the data depended upon is data for the previous calendar quarter.

Manager 110 then determines the locations within data warehouses 120 of the data sets depended on, as well as current state information associated with the stored data sets (block 404). For example, manager 110 may consult operations database 130 to determine, for each data set depended on, which data warehouses 120 host a copy of that data set, as well as the state information associated with that copy (e.g., currently being updated, current as of a particular date, offline for maintenance, etc.)

Based upon its analysis of data set dependencies of the received query as well as information about the location and state of data sets within data warehouses 120, manager 110 determines whether any data warehouse 120 has sufficient data to evaluate the received query (block 406). For example, in one embodiment manager 110 may determine that a data warehouse 120 has sufficient data to evaluate a given query if it has a copy of each data set depended upon by the query, if each data set depended upon is not otherwise being updated (e.g., by an extract-and-store operation such as illustrated in FIG. 3), and if each data set depended upon satisfies the state requirements of the query (e.g., that each data set is at least as current as any date range specified by the query). In other embodiments, manager 110 may use different or additional criteria to determine whether the data sufficiency of a given data warehouse 120 with respect to a given query. For example, such criteria may include information about the capabilities or resources of the data warehouse 120, such as its ability to evaluate certain types of query languages or its available computational resources for handling complex queries.

In some embodiments, one or more data warehouses 120 may be configured to manage query evaluation resources, such as by limiting the number of queries that may be concurrently evaluated by a given data warehouse 120. For example, a data warehouse 120 may be configured to provide a certain number of "job slots" for query execution, and may be unavailable to accept further queries if all slots are occupied. In some embodiments, a given query may correspond to one available job slot regardless of the complexity of the query. In other embodiments a more complex query may occupy multiple job slots, or other types of load balancing strategies may be employed by data warehouse 120. In some embodiments, manager 110 determining whether a given data warehouse 120 has sufficient data to evaluate a given query may also take into account available query evaluation resources of the given data warehouse 120. For example, in one embodiment a data warehouse 120 that has sufficient data to evaluate a query but no available resources for query evaluation may not be selected by manager 110.

If no data warehouse 120 has sufficient data to evaluate the received query (or, in some embodiments, if no data warehouse 120 has sufficient available resources to evaluate the received query), manager 110 may queue the query until such time as a sufficient data warehouse 120 can be identified (block 408). For example, in one embodiment, manager 110 may identify that the received query depends on a data set that is currently being updated to a particular data warehouse 120, and may schedule the query to be evaluated on that particular data warehouse 120 once the update is complete. Alternatively, manager 110 may occasionally reevaluate queued queries to determine whether a data warehouse 120 has become available to evaluate a query. In some embodiments, to avoid client deadlock, manager 110 may impose a limit on the length of time a query may remain queued, and may return an error condition to a client if its query exceeds the queuing time limit.

If a data warehouse 120 sufficient to evaluate the received query is identified, manager 110 conveys the received query to that data warehouse 120 for evaluation (block 410). It is noted that, under rough synchronization, a query targeting a particular data set may be evaluated by one data warehouse 120 while a replica of the particular data set is being updated on another data warehouse 120.

Figure 5A:
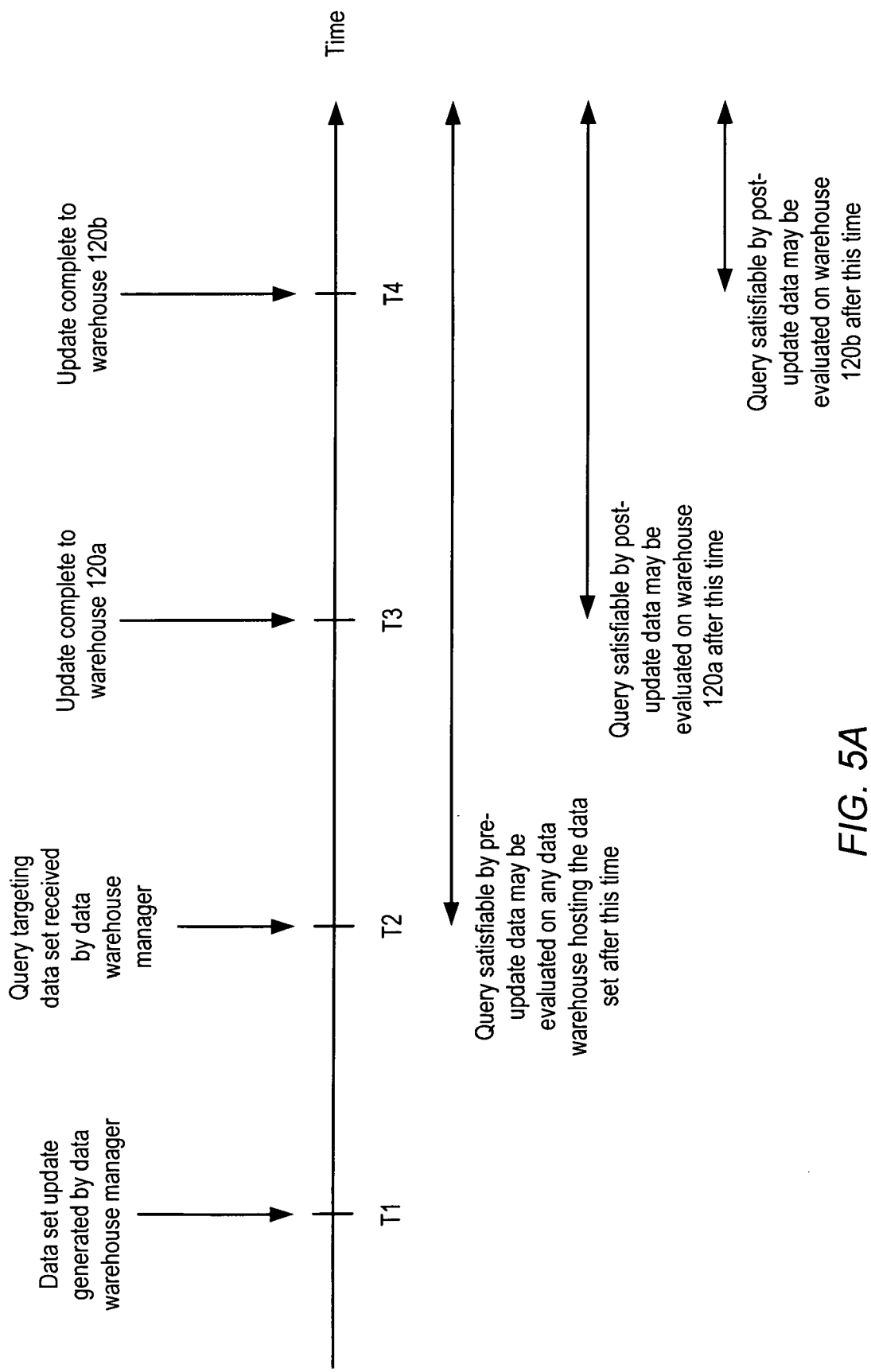
FIG. 5A is a timing diagram illustrating one embodiment of a relationship between data set updates and querying under rough synchronization.

A timing diagram illustrating one embodiment of a relationship between updating of data sets and queries of data sets under rough synchronization is shown in FIG. 5A. In the illustrated timing diagram, manager 110 begins updating a particular data set at time Ti, where the data set is replicated by data warehouses 120a-b. Subsequently, a query targeting the data set being updated is received by manager 110 at time T2. The data set update is complete at data warehouse 120a at time T3 later than T2, and is complete at data warehouse 120b at time T4 later than T3.

In the illustrated embodiment, three possible timeframes for evaluation of the received query are shown. In the first case, the query may be satisfiable by the pre-update contents of the data set being updated. For example, manager 110 in conjunction with operations database 130 may determine that the data necessary to evaluate the query does not depend on the current update. In this case, the query may be evaluated by any available data warehouse 120 that hosts the relevant data set after time T2. That is, the query may be evaluated as soon as practicable after it is received, which may incur a delay in some instances. For example, in some embodiments, a query may not be allowed to evaluate on a data warehouse 120 that is currently being updated, as noted above. Further, in some instances, data warehouses 120 may be too busy to immediately accept the query. However, in some embodiments, in the case of the query depending on pre-update data, there need not be any update-related temporal restriction on when the query may execute after time T2.

In the second and third cases, the query may depend on post-update contents of the data set being updated. That is, the query may require for its correct evaluation the data reflected in the data set update commenced at time T1. In the illustrated embodiment, this update completes at data warehouse 120a at time T3, and at data warehouse 120b at time T4. Correspondingly, the query may be evaluated by data warehouse 120a at any time after time T3, and by data warehouse 120b at any time after time T4. As noted previously and as illustrated in FIG. 5A, under rough synchronization, a query may be evaluated by a particular data warehouse 120 before all replicas of a data set targeted by that query have been updated, and in some cases (e.g., where the query depends on pre-update data) before the replica of that data set has been updated on the particular data warehouse 120. As noted above, in some embodiments a query targeting a particular data set may be evaluated by one data warehouse 120 while the particular data set is being stored to another data warehouse 120. Additionally, in some embodiments, after the particular data set has been stored to any given data warehouse 120, that given data warehouse 120 may evaluate a query directed to the particular data set. For example, after a replicated data set has been updated to some or all corresponding data warehouses 120, any of the updated data warehouses 120 may be able to satisfy a query to the replicated data set.

Also, it is noted that in some embodiments employing fine-grained mechanisms for locking portions of data sets, as described above, a given data warehouse 120 hosting a data set being updated may be available to evaluate a query to that data set before the update is complete. For example, in some embodiments manager 110 and operations database 130 may be configured to track the state of portions of data sets (e.g., individual rows or sets of rows of a table). While one portion of a particular data set is being updated on a given data warehouse 120, manager 110 may determine that a given query depends on a portion of the particular data set that is not currently being updated, and may consequently allow the query to be evaluated by the given data warehouse 120. In such embodiments, a query to a portion of a data set that is not undergoing an update may be functionally treated as though the query were dependent upon a data set independent from the data set being updated, and may be allowed to evaluate independently of the update. In the context of FIG. 5A, such a query may be allowed to evaluated any time after it is received at time T2, without synchronizing with the update completion points at times T3 and T4.

Figure 5B:
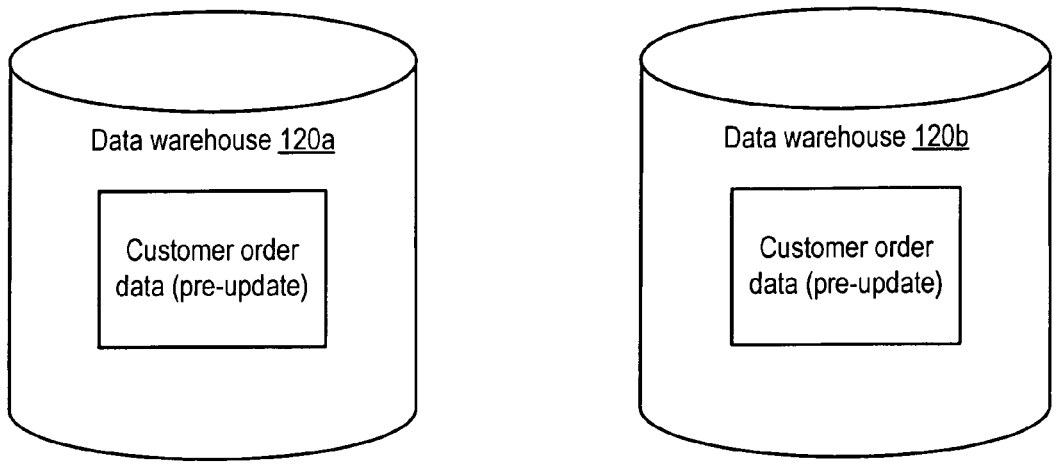
FIGS. 5B-D are block diagrams illustrating one exemplary embodiment of a data set replicated using rough synchronization.
Figure 5C:
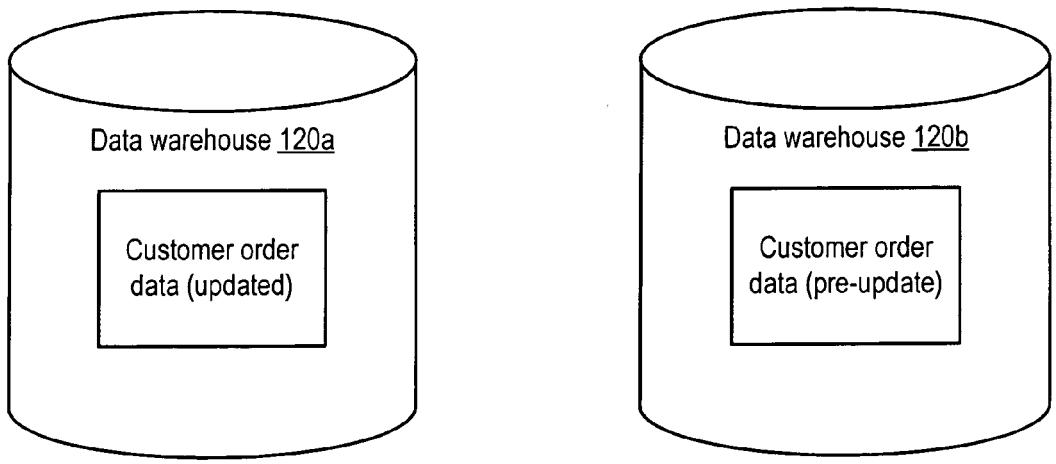
Figure 5D:
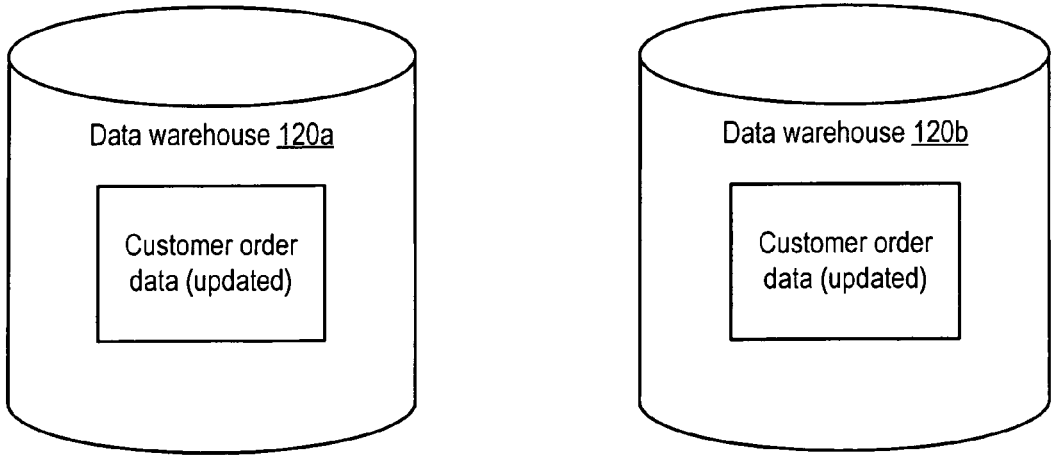

FIGS. 5B-5D illustrate a particular example of one embodiment of a data set replicated using rough synchronization relative to various points in time shown in FIG. 5A. In the embodiment shown in FIGS. 5B-5D, a customer order data set is configured to be replicated by data warehouses 120a-b. FIG. 5B illustrates the replicas of the customer order data set at a time prior to the beginning of an update (e.g., a time prior to time T1 shown in FIG. 5A). In FIG. 5B, both replicas of the customer order data set are shown in the pre-update state.

FIG. 5C illustrates the replicas of the customer order data set at a time after the replica of data warehouse 120a has been updated, but before the replica of data warehouse 120b has been updated (e.g., a time between time T3 and T4 shown in FIG. 5A). As shown in FIG. 5C, the two replicas of the customer order data sets are in dissimilar states. Finally, FIG. 5D illustrates the replicas of the customer order data set at a time after both replicas have been updated (e.g., a time after time T4 shown in FIG. 5A). As described above, queries to the customer order data set may arrive at any time after an update to the data set commences. Depending on its data set requirements, a particular query may be allowed to execute on either of data warehouses 120a-b before the update is complete to both data warehouses 120a-b, including at a time when both data set replicas have dissimilar content (e.g., as shown in FIG. 5C).

It is noted that in some embodiments, the organization of data warehouse system 100 may be completely transparent to clients 140 configured to interact with system 100. That is, in some embodiments, clients 140 may have no direct knowledge of the location or status of a given data set within data warehouses 120. In some such embodiments, manager 110 may be configured to present data warehouses 120 as a single virtual data warehouse as seen from the perspective of clients 140 (e.g., manager 110 may be configured to virtualize data warehouses 120). Thus, in some such embodiments, manager 110 may be free to replicate data sets to an arbitrary degree, to relocate data sets among data warehouses 120, or to otherwise alter the organization of data stored within system 100, while presenting a single, stable interface (such as a query interface) to clients 140.

In one embodiment, at any given time, multiple data sets stored by data warehouses 120 may be available for querying by a given client 140, and at any given time one of the stored data sets may be dissimilar from another one of the stored data sets. For example, the two stored data sets may be dissimilar because they are defined to store different types of data. Alternatively, two stored data sets may be configured to replicate the same data, but may be dissimilar at a given time due to the operation of rough synchronization as described above. In some embodiments, multiple data sets under either of these scenarios may be available for querying by clients 140, and manager 110 may be configured to manage the details of how such data sets are arranged and manipulated within data warehouse system 100 in a manner transparent to clients 140.

Figure 6:
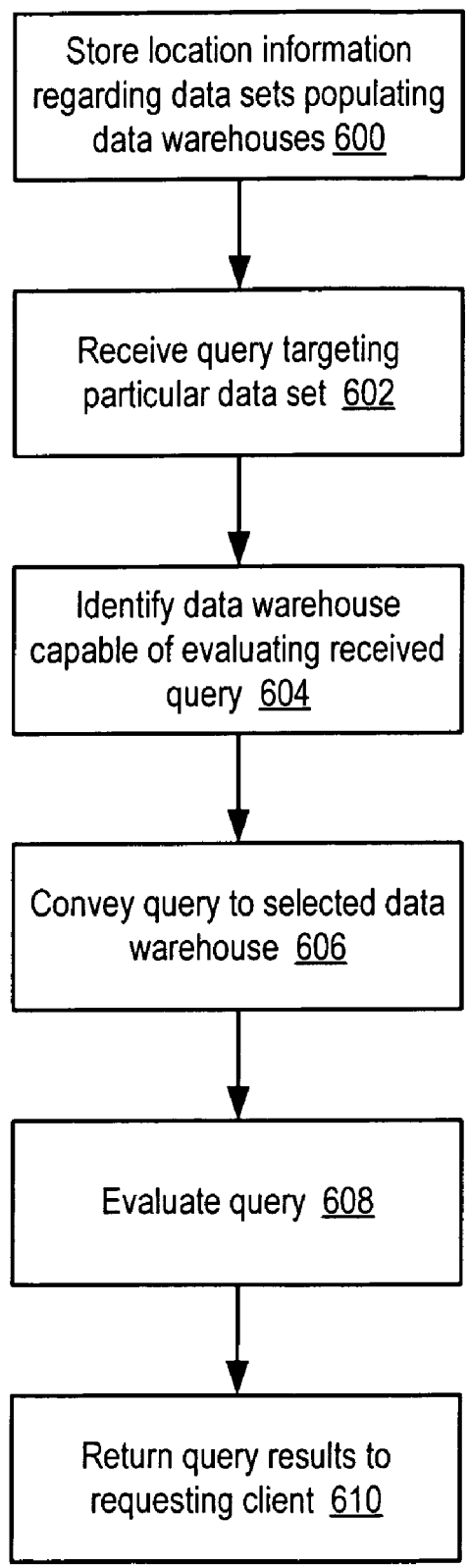
FIG. 6 is a flow diagram illustrating one embodiment of a method of virtualizing data warehouses to a client.

Virtualization of data warehouses 120 with respect to clients 140 may occur irrespective of whether data sets stored within data warehouses 120 are replicated. One embodiment of a method of virtualizing data warehouses 120 to a client 140 as a single data warehouse is illustrated in FIG. 6. Referring collectively to FIG. 1 through FIG. 6, operation begins in block 600 where manager 110 stores location information regarding the data sets populating data warehouses 120. For example, in one embodiment, manager 110 may store location information for each data set in operations database 130, along with other information identifying the state of the data set, whether the data set is replicated, etc.

Subsequently, manager 110 receives a query targeting a particular data set stored within data warehouse system 100 (block 602). Responsively, manager 110 identifies a particular data warehouse 120 capable of evaluating the received query (block 604). For example, manager 110 may be configured to analyze the query to detect data set and state dependencies as described above, and to consult operations database 130 to identify a data warehouse 120 (or more than one, if the data set is replicated) that can evaluate the query. Other factors, such as ongoing data set updates, data warehouse workload, etc. may influence the identification of a suitable data warehouse 120 for query evaluation.

Once a data warehouse 120 has been identified to evaluate the received query, manager 110 conveys the query to the selected data warehouse 120 for evaluation (block 606). The query is then evaluated (block 608) and results are returned to the requesting client 140 via manager 110 (block 610). It is noted that in some embodiments, all steps between submission of a query and receipt of query results may be transparent to a client 140. It is further noted that in some instances, manager 110 may queue a query if it cannot immediately identify a suitable data warehouse 120 for evaluation. Additionally, manager 110 may return an error condition to a requesting client 140 in some instances, for example if a query is malformed or times out waiting for a data warehouse 120.

Data Warehouse Computational Infrastructure

Each of data warehouses 120 may include a respective set of computational hardware as well as operating system software and data warehousing software (e.g., database software) configured to implement the data warehousing function. In some embodiments, the computational hardware used may include proprietary, high-end multiprocessor computer systems that may be carefully integrated with customized versions of operating systems and data warehousing software specific to a particular installation. However, such configurations may be expensive to purchase, administer and maintain. Consequently, in some embodiments, any or all of data warehouses 120 each may include a respective computing cluster assembled from less-expensive (e.g., commodity) computer systems running operating systems and/or data warehousing software that is widely distributed or open-source.

Figure 7:
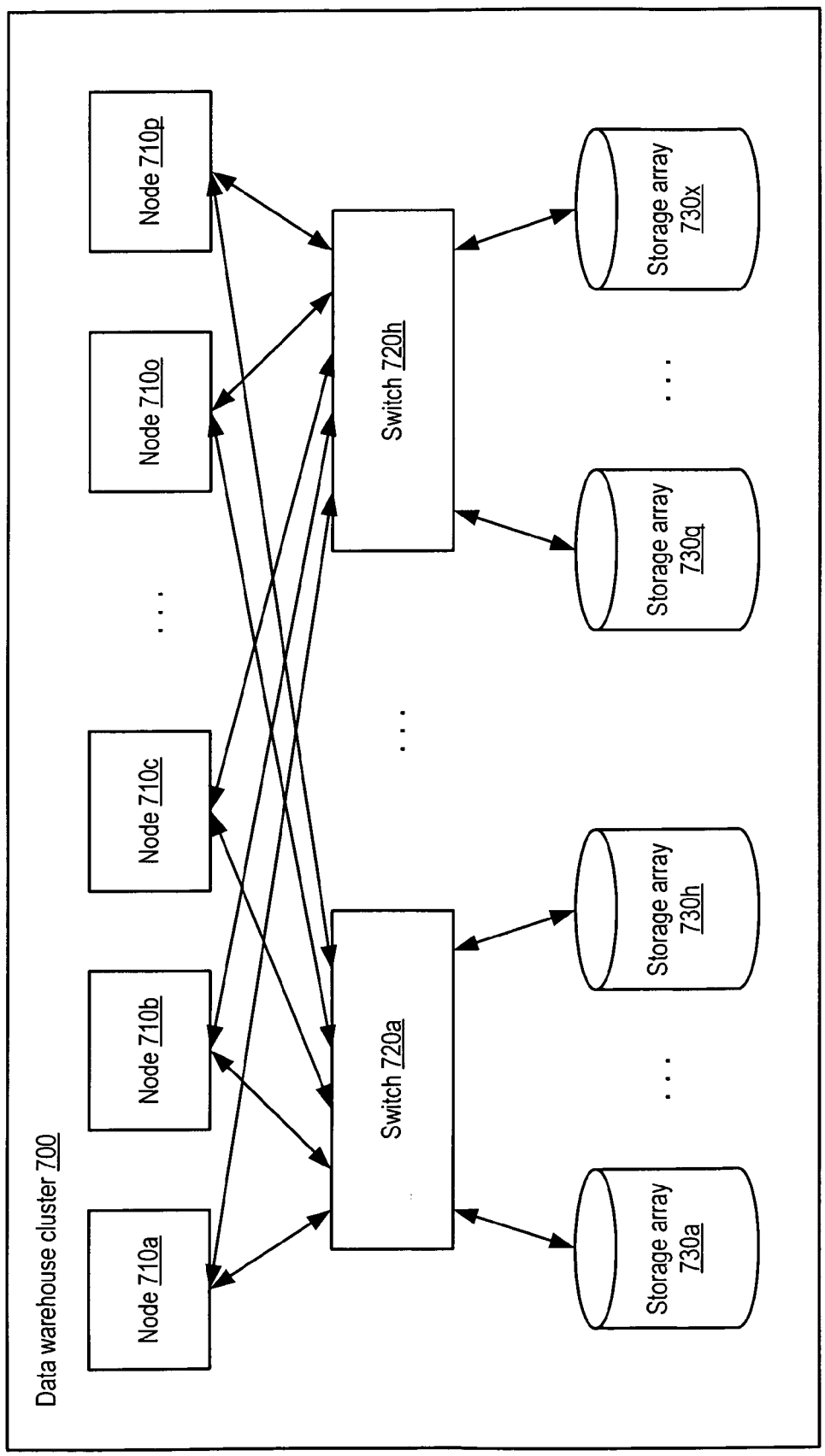
FIG. 7 is a block diagram illustrating one embodiment of a data warehouse computing cluster.

One embodiment of a computing cluster on which a data warehouse 120 may be implemented is illustrated in FIG. 7. In the illustrated embodiment, data warehouse cluster 700 (or simply, cluster 700) includes a number of computing nodes 710 (or simply, nodes 710). Each of nodes 710 is coupled to each of a number of switches 720, and each switch 720 is coupled to a respective number of storage arrays 730. Thus, in the illustrated embodiment, each node 710 may access any of storage arrays 730 through an appropriate switch 720. In one embodiment, cluster 700 may include sixteen nodes 710, eight switches 720, and 64 storage arrays 730. However, it is noted that in various embodiments, arbitrary numbers of nodes 710, switches 720 and storage arrays 730 as well as various topologies for interconnecting these elements may be employed.

Figure 8:
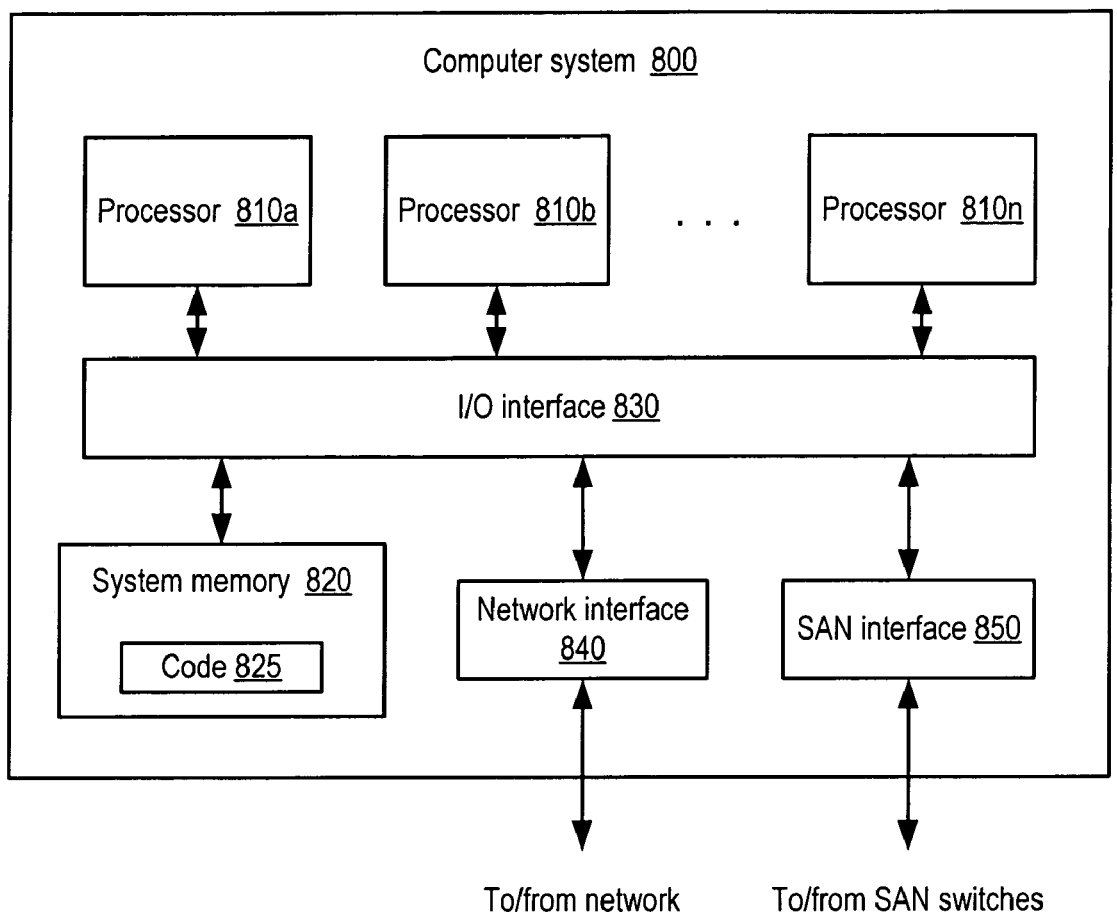
FIG. 8 is a block diagram illustrating an exemplary embodiment of a computer system.

In one embodiment, each of nodes 710 may include a uniprocessor or multiprocessor computer system, as described in greater detail below in conjunction with the description of FIG. 8. In some embodiments, nodes 710 may include generic server, personal computer or workstation systems available from any of a number of vendors including Sun Microsystems, Hewlett-Packard, IBM, Dell, or any suitable system manufacturer. Further, nodes 710 may be configured to execute one or more suitable operating systems, such as an operating system compliant with a version of Linux, Microsoft Windows, Solaris, HP-UX, AIX or any other suitable generally-available or proprietary operating system.

Generally speaking, each of nodes 710 may be operable to evaluate queries received via manager 110, as well as other data warehouse operations, against data sets that may be stored via storage arrays 730, while switches 730 provide interconnectivity between nodes 710 and storage arrays 730. Thus, in the illustrated embodiment, a query being evaluated on a particular node 710 may uniformly access data sets stored on any of storage arrays 730. In other embodiments, data sets may be nonuniformly available to nodes 710. For example, a given node 710 may be mapped to a specific one or more of storage arrays 730 that include some data sets but not others. In such embodiments, multiple nodes 710 may need to participate in the evaluation of a particular query, depending on how the data sets depended on by the query are distributed across storage arrays 730.

In some embodiments, switches 720 and storage arrays 730 may include a storage area network (SAN). For example, switches 720 may be coupled to nodes 710 and storage arrays 730 using Fibre Channel interconnects, or other suitable SAN interconnect and management technologies. However, it is contemplated that any suitable type of network may be used to interconnect the devices of cluster 700. For example, in one embodiment, Gigabit Ethernet or 10-Gigabit Ethernet may be used as the interconnect technology.

Each of storage arrays 730 may include one or more mass storage devices, such as fixed magnetic-disk drives. For example, in one embodiment each storage array 730 may include an identical number of SCSI (Small Computer Systems Interface) hard drives configured as a Redundant Array of Independent Disks (RAID array). The various storage features supported by a storage array 730, such as disk striping, mirroring, and data parity, for example, may be managed by the storage array 730 itself. For example, storage array 730 may include, in addition to mass storage devices, additional hardware configured to manage those devices. Alternatively, a storage array 730 may be relatively passive, and its storage features may be managed by an intelligent switch 720. It is contemplated that a given storage array 730 may include other types of storage devices in addition to or instead of magnetic disks, such as optical media or magnetic tape, for example. Further, it is contemplated that in some embodiments, each of storage arrays 730 may be identically configured, while in other embodiments, storage arrays 730 may be heterogeneous in their configuration and/or feature set.

In some embodiments, cluster 700 may be readily scalable to match the expected workload of a given data warehouse 120. For example, if a data warehouse 120 is expected to house a large quantity of data that receives infrequent or relatively simple queries, the storage arrays 730 may be provisioned to store the expected quantity of data (including any desired data set replication as described above) while nodes 710 may be separately provisioned based on the expected workload. If query workload or storage requirements should increase, additional nodes 710, switches 720, and/or storage arrays 730 may be added later.

It is contemplated that in some embodiments, any of the methods or techniques described above, e.g., the functions of manager 110 or data warehouses 120, or the methods illustrated in FIGS. 3, 4 and 6, may be implemented as program instructions and data capable of being stored or conveyed via a computer-accessible medium. Such program instructions may be executed to perform a particular computational function, such as data warehousing and virtualization, storage management, query and data set analysis, query evaluation, operating system functionality, applications, and/or any other suitable functions. In one embodiment, nodes 710 may include computer-accessible media. One embodiment of a computer system that may be illustrative of a given node 710 is illustrated in FIG. 8. In the illustrated embodiment, computer system 800 includes one or more processors 810 coupled to a system memory 820 via an input/output (I/O) interface 830. Node 710 further includes a network interface 840 and a SAN interface 850, each coupled to I/O interface 830.

It is noted that in some embodiments, an instance of computer system 800 may be configured separately from a cluster 700 and configured to execute other applications or functions within data warehouse system 100. For example, in one embodiment, one or more instances of computer system 800 may be provisioned externally to a cluster 700 and configured to execute program instructions and data that may be stored or conveyed via a computer-accessible medium and configured to implement manager 110. In some such embodiments, the configuration of an instance of computer system 800 configured to implement manager 110 may differ from that shown in FIG. 8. For example, in some embodiments, such an instance of computer system 800 may include more or fewer processors 810. Further, while in some embodiments such an instance may preserve SAN interface 850, this interface may also be omitted.

As noted above, in various embodiments computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be a general-purpose or embedded processor implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by process 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 820 as code 825.

In one embodiment, I/O interface 830 may be configured to coordinate I/O traffic between processor 810, system memory 820, and any peripheral devices in the device, including network interface 840, SAN interface 850, or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network. For example, manager 110 may be configured to execute on a computer system 800 external to a cluster 700, and a particular computer system 800 configured as a node 710 within cluster 700 may communicate with manager 110 on the external system via network interface 840. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In one embodiment, SAN interface 850 may be configured to allow data to be exchanged between computer system 800 and storage arrays 730 via switches 720. In some embodiments, as described above, SAN interface 850 may include a Fibre Channel interface or another suitable interface. However, it is contemplated that in some embodiments, SAN connectivity may be implemented over standard network interfaces. In such embodiments, computer system 800 may provide a single network interface (e.g., network interface 840) for communication with both storage devices and other computer systems, or computer system 800 may spread storage device and general network communications uniformly across several similarly configured network interfaces.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk, CD-ROM or DVD-ROM coupled to computer system 800 via I/O interface 830, or a storage array 730 coupled to computer system 800 via SAN interface 850. A computer-accessible medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840 or SAN interface 850.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
   a plurality of data warehouses; and
   a data warehouse manager configured to extract data sets from one or more data sources for storage in one or more of said plurality of data warehouses;
   wherein each of a first subset comprising two or more of said plurality of data warehouses is configured to store a respective replica of a first data set extracted by said data warehouse manager; and
   wherein said data warehouse manager is further configured to allow a query dependent upon said first data set to be evaluated by one of said first subset of data warehouses before each respective replica of said first data set has been stored to a corresponding data warehouse of said first subset.

2. The system as recited in claim 1, wherein said query is evaluated by a first data warehouse of said first subset while said first data set is being stored to another data warehouse of said first subset.

3. The system as recited in claim 1, wherein said data warehouse manager is further configured to allow said query to be evaluated by any given data warehouse of said first subset after said first data set has been stored to said given data warehouse.

4. The system as recited in claim 1, wherein storing of said first data set to each of said first subset of data warehouses occurs at least partially concurrently.

5. The system as recited in claim 1, wherein a given one of said plurality of data warehouses is configured to store a second data set extracted by said data warehouse manager, and wherein at least another one of said plurality of data warehouses does not store any replica of said second data set.

6. The system as recited in claim 1, wherein each of said plurality of data, warehouses comprises a respective relational database.

7. The system as recited in claim 1, wherein said data warehouse manager is further configured to store in an operations database identifying information corresponding to each data set stored within said plurality of data warehouses.

8. The system as recited in claim 7, wherein for said first data set, said identifying information comprises respective identities of each of said first subset of data warehouses and respective state information indicating whether said first data set has been stored to a corresponding one of said first subset of data warehouses.

9. The system as recited in claim 8, wherein said data warehouse manager is further configured to determine that a given one of said first subset of data warehouses has sufficient data to evaluate said query according to said respective state information, and to responsively convey said query to said given one of said first subset for evaluation.

10. The system as recited in claim 1, wherein at least two of said plurality of data warehouses are located at different physical sites.

11. The system as recited in claim 1, wherein each of said plurality of data warehouses comprises a respective computing cluster, wherein a given respective computing cluster comprises at least one computing node coupled to a plurality of storage devices via a storage area network (SAN).

12. The system as recited in claim 11, wherein said at least one computing node is configured to execute an operating system compliant with a version of Linux.

13. The system as recited in claim 1, wherein said data warehouse manager is configured to receive said query from a requesting application via a web services interface.

14. A method, comprising:
    extracting data sets from one or more data sources for storage in one or more of a plurality of data warehouses;
    storing a respective replica of a first data set in each data warehouse of a first subset comprising two or more of said plurality of data warehouses; and
    allowing a query dependent upon said first data set to be evaluated by one of said first subset of data warehouses before each respective replica of said first data set has been stored to a corresponding data warehouse of said first subset.

15. The method as recited in claim 14, further comprising a first data warehouse of said first subset evaluating said query while another data warehouse of said first subset is storing said first data set.

16. The method as recited in claim 14, further comprising allowing said query to be evaluated by any given data warehouse of said first subset after said first data set has been stored to said given data warehouse.

17. The method as recited in claim 14, wherein storing of said first data set to each of said first subset of data warehouses occurs at least partially concurrently.

18. The method as recited in claim 14, wherein a given one of said plurality of data warehouses is configured to store a second data set extracted by said data warehouse manager, and wherein at least another one of said plurality of data warehouses does not store any replica of said second data set.

19. The method as recited in claim 14, wherein each of said plurality of data warehouses comprises a respective relational database.

20. The method as recited in claim 14, further comprising storing in an operations database identifying information corresponding to each data set stored within said plurality of data warehouses.

21. The method as recited in claim 20, wherein for said first data set, said identifying information comprises respective identities of each of said first subset of data warehouses and respective state information indicating whether said first data set has been stored to a corresponding one of said first subset of data warehouses.

22. The method as recited in claim 21, further comprising:
    determining that a given one of said first subset of data warehouses has sufficient data to evaluate said query according to said respective state information; and
    conveying said query to said given one of said first subset for evaluation in response to said determining.

23. The method as recited in claim 14, wherein at least two of said plurality of data warehouses are located at different physical sites.

24. The method as recited in claim 14, wherein each of said plurality of data warehouses comprises a respective computing cluster, wherein a given respective computing cluster comprises at least one computing node coupled to a plurality of storage devices via a storage area network (SAN).

25. The method as recited in claim 24, wherein said at least one computing node is configured to execute an operating system compliant with a version of Linux.

26. The method as recited in claim 14, further comprising receiving said query from a requesting application via a web services interface.

27. A computer-accessible storage medium comprising program instructions, wherein the program instructions are executable by a computer system to:
    extract data sets from one or more data sources for storage in one or more of a plurality of data warehouses;

store a respective replica of a first data set in each of a first subset comprising two or more of said plurality of data warehouses; and allow a query dependent upon said first data set to be evaluated by one of said first subset of data warehouses before each respective replica of said first data set has been stored to a corresponding data warehouse of said first subset.

28. The computer-accessible storage medium as recited in claim 27, wherein a first data warehouse of said first subset evaluates said query while another data warehouse of said first subset is storing said first data set.

29. The computer-accessible storage medium as recited in claim 27, wherein said program instructions are further executable to allow said query to be evaluated by any given data warehouse of said first subset after said first data set has been stored to said given data warehouse.

30. The computer-accessible storage medium as recited in claim 27, wherein storing of said first data set to each of said first subset of data warehouses occurs at least partially concurrently.

31. The computer-accessible storage medium as recited in claim 27, wherein each of said plurality of data warehouses comprises a respective relational database.

32. The computer-accessible storage medium as recited in claim 27, wherein the program instructions are further executable to store in an operations database identifying information corresponding to each data set stored within said plurality of data warehouses.

33. The computer-accessible storage medium as recited in claim 32, wherein for said first data set, said identifying information comprises respective identities of each of said first subset of data warehouses and respective state information indicating whether said first data set has been stored to a corresponding one of said first subset of data warehouses.

34. The computer-accessible storage medium as recited in claim 33, wherein the program instructions are further executable to:

determine that a given one of said first subset of data warehouses has sufficient data to evaluate said query according to said respective state information; and convey said query to said given one of said first subset for evaluation in response to said determining.

35. The computer-accessible storage medium as recited in claim 27, wherein the program instructions are further executable to implement an operating system compliant with a version of Linux.

36. The computer-accessible storage medium as recited in claim 27, wherein the program instructions are further executable to receive said query from a requesting application via a web services interface.

37. A system, comprising:

a plurality of data warehouses configured to store data sets extracted from one or more data sources; and a data warehouse manager configured to present said plurality of data warehouses to a client as a single data warehouse, wherein location of said data sets within said plurality of data warehouses is transparent to said client;

wherein at a given time, a first data set stored by a first one of said plurality of data warehouses and available at said given time to said client for querying is dissimilar to a second data set stored by a second one of said plurality of data warehouses and available at said given time to said client for querying; and wherein, in response to receiving from said client a query directed to a data set stored by one or more of said plurality of data warehouses, said data warehouse manager is further configured to identify a particular one of said plurality of data warehouses capable of evaluating said query and to convey said query to said particular data warehouse for evaluation.

38. The system as recited in claim 37, wherein each of a first subset comprising two or more of said plurality of data warehouses is configured to store a respective replica of a given data set.

39. The system as recited in claim 38, wherein said data warehouse manager is further configured to allow a query dependent upon said given data set to be evaluated by one of said first subset of data warehouses before each respective replica of said given data set has been stored to a corresponding data warehouse of said first subset.

40. The system as recited in claim 37, wherein a given one of said plurality of data warehouses is configured to store a second data set, and wherein at least another one of said plurality of data warehouses does not store any replica of said second data set.

41. The system as recited in claim 37, wherein each of said plurality of data warehouses comprises a respective relational database.

42. The system as recited in claim 37, wherein said data warehouse manager is further configured to store in an operations database identifying information corresponding to each data set stored within said plurality of data warehouses.

43. The system as recited in claim 42, wherein for a given data set, said identifying information comprises respective identities of each of said one or more data warehouses on which said given data set is stored or to be stored, and wherein said identifying information further comprises respective state information indicating whether said given data set has been stored to a corresponding data warehouse.

44. The system as recited in claim 43, wherein said data warehouse manager identifying said particular data warehouse capable of evaluating said query further comprises determining that said particular data warehouse has sufficient data to evaluate said query according to said respective state information.

45. The system as recited in claim 37, wherein said data warehouse manager is further configured to receive said query from a requesting application via a web services interface.

46. A method, comprising:

extracting data sets from one or more data sources for storage in one or more of a plurality of data warehouses;

presenting said plurality of data warehouses to a client as a single data warehouse, wherein location of said data sets within said plurality of data warehouses is transparent to said client; and in response to receiving from said client a query directed to a data set stored by one or more of said plurality of data warehouses, identifying a particular one of said plurality of data warehouses capable of evaluating said query and conveying said query to said particular data warehouse for evaluation;

wherein at a given time, a first data set stored by a first one of said plurality of data warehouses and available at said given time to said client for querying is dissimilar to a second data set stored by a second one of said plurality of data warehouses and available at said given time to said client for querying.

47. The method as recited in claim 46, wherein each of a first subset comprising two or more of said plurality of data warehouses is configured to store a respective replica of a given data set.

48. The method as recited in claim 47, further comprising allowing a query dependent upon said given data set to be evaluated by one of said first subset of data warehouses before each respective replica of said given data set has been stored to a corresponding data warehouse of said first subset.

49. The method as recited in claim 46, wherein a given one of said plurality of data warehouses is configured to store a second data set, and wherein at least another one of said plurality of data warehouses does not store any replica of said second data set.

50. The method as recited in claim 46, wherein each of said plurality of data warehouses comprises a respective relational database.

51. The method as recited in claim 46, further comprising storing in an operations database identifying information corresponding to each data set stored within said plurality of data warehouses.

52. The method as recited in claim 51, wherein for a given data set, said identifying information comprises respective identities of each of said one or more data warehouses on which said given data set is stored or to be stored, and wherein said identifying information further comprises respective state information indicating whether said given data set has been stored to a corresponding data warehouse.

53. The method as recited in claim 52, wherein identifying said particular data warehouse capable of evaluating said query further comprises determining that said particular data warehouse has sufficient data to evaluate said query according to said respective state information.

54. The method as recited in claim 46, further comprising receiving said query from a requesting application via a web services interface.

55. A computer-accessible storage medium comprising instructions, wherein the program instructions are executed to:
  extract data sets from one or more data sources for storage in one or more of a plurality of data warehouses;
  present said plurality of data warehouses to a client as a single data warehouse, wherein location of said data sets within said plurality of data warehouses is transparent to said client; and
  in response to receiving from said client a query directed to a data set stored by one or more of said plurality of data warehouses, to identify a particular one of said plurality of data warehouses capable of evaluating said query to convey said query to said particular data warehouse for evaluation;
  wherein at a given time, a first data set stored by a first one of said plurality of data warehouses and available at said given time to said client for querying is dissimilar to a second data set stored by a second one of said plurality of data warehouses and available at said given time to said client for querying.

56. The computer-accessible storage medium as recited in claim 55, wherein each of a first subset comprising two or more of said plurality of data warehouses is configured to store a respective replica of a given data set.

57. The computer-accessible storage medium as recited in claim 56, further comprising allowing a query dependent upon said given data set to be evaluated by one of said first subset of data warehouses before each respective replica of said given data set has been stored to a corresponding data warehouse of said first subset.

58. The computer-accessible storage medium as recited in claim 55, wherein a given one of said plurality of data warehouses is configured to store a second data set, and wherein at least another one of said plurality of data warehouses does not store any replica of said second data set.

59. The computer-accessible storage medium as recited in claim 55, wherein each of said plurality of data warehouses comprises a respective relational database.

60. The computer-accessible storage medium as recited in claim 55, further comprising storing in an operations database identifying information corresponding to each data set stored within said plurality of data warehouses.

61. The computer-accessible storage medium as recited in claim 60, wherein for a given data set, said identifying information comprises respective identities of each of said one or more data warehouses on which said given data set is stored or to be stored, and wherein said identifying information further comprises respective state information indicating whether said given data set has been stored to a corresponding data warehouse.

62. The computer-accessible storage medium as recited in claim 61, wherein identifying said particular data warehouse capable of evaluating said query further comprises determining that said particular data warehouse has sufficient data to evaluate said query according to said respective state information.

63. The computer-accessible storage medium as recited in claim 55, further comprising receiving said query from a requesting application via a web services interface.

64. A system, comprising:
  a plurality of data warehouses;
  a data warehouse manager configured to extract data sets from one or more data sources for storage in one or more of said plurality of data warehouses; and
  an operations database configured to interact with said data warehouse manager and to store data warehouse state information associated with said data sets;
  wherein, in response to receiving from a given one of a plurality of clients a query directed to a data set stored by one or more of said plurality of data warehouses, said data warehouse manager is further configured to identify a particular one of said plurality of data warehouses capable of evaluating said query and to convey said query to said particular data warehouse for evaluation, wherein said identifying is dependent upon said data warehouse state information.

65. The system as recited in claim 64, wherein for a given data set, said data warehouse state information associated with said given data set comprises information identifying one or more of said plurality of data warehouses configured to store said given data set.

66. The system as recited in claim 64, wherein for a given data set, said data warehouse state information associated with said given data set comprises information identifying a state of said given data set with respect to an operation to modify contents of said given data set.

67. The system as recited in claim 64, wherein each of a first subset comprising two or more of said plurality of data warehouses is configured to store a respective replica of a first data set extracted by said data warehouse manager, and wherein said data warehouse manager is further configured to allow a query dependent upon said first data set to be evaluated by one of said first subset of data warehouses before each respective replica of said first data set has been stored to a corresponding data warehouse of said first subset.

68. The system as recited in claim 64, wherein said data warehouse manager is further configured to present said plurality of data warehouses to said given client as a single data warehouse, wherein location of said data sets within said plurality of data warehouses is transparent to said given client.

69. The system as recited in claim 68, wherein at a given time, a first data set stored by a first one of said plurality of data warehouses and available at said given time to said given client for querying is dissimilar to a second data set stored by a second one of said plurality of data warehouses and available at said given time to said given client for querying.

* * * * *